United States Patent
Bouzas et al.

(10) Patent No.: US 9,405,533 B2
(45) Date of Patent: Aug. 2, 2016

(54) UNMANNED VEHICLE SYSTEMS AND METHODS OF OPERATION

(71) Applicant: Schlumberger Technology Corporation, Sugar Land, TX (US)

(72) Inventors: Horacio Ricardo Bouzas, Houston, TX (US); Reishin Toolsi, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 14/590,697

(22) Filed: Jan. 6, 2015

(65) Prior Publication Data

US 2015/0192437 A1 Jul. 9, 2015

Related U.S. Application Data

(60) Provisional application No. 61/924,605, filed on Jan. 7, 2014.

(51) Int. Cl.
| | |
|---|---|
| *B25J 11/00* | (2006.01) |
| *G06F 9/00* | (2006.01) |
| *G06F 7/00* | (2006.01) |
| *G06F 3/00* | (2006.01) |
| *G06F 9/48* | (2006.01) |

(52) U.S. Cl.
CPC .. *G06F 9/00* (2013.01); *G06F 3/00* (2013.01); *G06F 7/00* (2013.01); *G06F 9/4843* (2013.01); *G06F 2209/5019* (2013.01)

(58) Field of Classification Search
CPC ........ G01D 9/00; B25J 9/1602; B25J 9/1664; G06F 7/00; G06F 9/00; G05D 1/0274; G05D 1/0246; G05D 1/0248

USPC ............. 701/2, 400, 408; 700/245, 259, 258; 318/568.12, 568.16, 587
See application file for complete search history.

(56) References Cited

U.S. PATENT DOCUMENTS

| | | | |
|---|---|---|---|
| 2004/0128097 A1* | 7/2004 | LaMarca | G01D 9/005 702/104 |
| 2007/0273557 A1 | 11/2007 | Baillot et al. | |
| 2010/0106344 A1 | 4/2010 | Edwards et al. | |
| 2012/0191269 A1 | 7/2012 | Chen et al. | |
| 2013/0234864 A1 | 9/2013 | Herman et al. | |
| 2014/0365258 A1* | 12/2014 | Vestal | G06Q 10/063114 705/7.15 |

FOREIGN PATENT DOCUMENTS

WO   2009058697 A1   5/2009

OTHER PUBLICATIONS

International Search Report and Written Opinion issued in PCT/US2015/010446 on Apr. 28, 2015, 14 pages.

* cited by examiner

*Primary Examiner* — Dalena Tran
(74) *Attorney, Agent, or Firm* — Alec J. McGinn

(57) ABSTRACT

The present invention is directed to unmanned vehicle (UV) systems and methods. A method may include capturing data with at least one UV proximate an area of interest. The method may also include processing the data at a computing device. In addition, the method may include at least storing the processed data, sharing the processed data with another device, combining the processed data with related historical data, developing a model based at least partially on the processed data, determining at least one future task to be performed by the UV based at least partially on the processed data, or any combination thereof.

20 Claims, 5 Drawing Sheets

UNMANNED VEHICLE SYSTEMS AND METHODS OF OPERATION

CROSS-REFERENCE TO RELATED APPLICATIONS

This application claims priority to the U.S. Provisional Patent Application having Ser. No. 61/924,605 filed on 7 Jan. 2014 and entitled "Ocean Service for Autonomous Unmanned Vehicles," the entirety of which is incorporated herein by reference.

TECHNICAL FIELD

This disclosure relates generally to unmanned vehicle systems and methods and, more specifically, to methods and systems for processing and utilizing data captured via at least one unmanned vehicle.

BACKGROUND

Several industries use unmanned vehicles ("UVs") for various procedures, such as exploring, monitoring, and performing repair and/or recovery tasks. In the oil and gas industry, for example, there is an increased need for UVs to perform tasks, such as exploring and monitoring an oilfield, observing gas flares, and studying the environmental impact of oil and gas systems.

BRIEF SUMMARY OF THE INVENTION

In one specific embodiment, a method may include sensing data with one or more sensing devices of an unmanned vehicle (UV). As non-limiting examples, the one or more sensing devices may comprise cameras, location-based sensors, electromagnetic spectrum sensors, gamma ray sensors, biological sensors, chemical sensors, and thermal sensors. Further, the method may include conveying sensed data from the UV to a computing device. In one example, the computing device may be remote from a location of the UV and may be configured to receive the sensed data via a wireless communication link, a wired communication link, or a combination thereof. Moreover, the method may include receiving at least one control signal from the computing device for controlling operation of the UV. More specifically, in one example, after processing the sensed data, the computing device may convey the one or more control signals, which may be received and used by the UV for controlling operation thereof to, for example, acquire additional data.

In another specific embodiment, a method includes receiving data sensed by an UV, which is proximate at least one area of interest, at a computing device. As non-limiting examples, the sensed data may comprise photographs, location data (e.g., GPS data), electromagnetic spectrum data, gamma ray data, biological data, chemical data, temperature data, mechanical data, electrical data, or any combination thereof. The method may also include processing the sensed data to generate information related to the at least one area of interest, which may comprise, for example only, an area near an oilfield. The method may further include conveying the information via at least one output device. As an example, the information may be conveyed to a user (e.g., via a display device). The information may also be used to generate control signals, which may be conveyed from the computing device to the UV for controlling operation thereof.

Another embodiment may include a method comprising capturing data with at least one UV proximate an area of interest and processing the data at a computing device. In one example, the computing device may be remote from and may be communicatively coupled to the UV. The method may also include at least one of: storing the processed data; sharing the processed data with another device; combining the processed data with related historical data; developing a model based at least partially on the processed data; and determining at least one future task to be performed by the UV based at least partially on the processed data.

Another embodiment includes a system comprising a UV and a computing device. The UV may include one or more sensing devices for capturing data proximate thereto. The computing device, which may be remote from and communicatively coupled to the UV, may be configured to receive and process data sensed by the one or more sensing devices. The processed data may be, for example only, stored (e.g., electronically stored), shared with other systems, combined with related historical data, used to develop models, used in decision making (e.g., determining future tasks to be performed by the UV), or any combination thereof.

Yet other embodiments of the present invention comprise computer-readable media storage storing instructions that when executed by a processor cause the processor to perform instructions in accordance with one or more embodiments described herein.

As will be appreciated, various embodiments disclosed herein may integrate UV technology with application programs for modeling, such as petrotechnical modeling, geophysical modeling, geomechanical modeling, exploration modeling, production modeling, and other types of modeling. For example, UV technology may be integrated with an application program (e.g. software), such as Petrel® (owned by Schlumberger of Houston, Tex.), Ocean® (also owned by Schlumberger), and the like. According to one example, a UV may perform a monitoring task and capture data (e.g., one or more images). The captured data may be accessed through a software platform in real-time, processed, and displayed on a computing device (e.g., a computing device executing the application program). The captured data may also be shared through an application program, such as Studio® to Avocet® or Techlog® (each of which being owned by Schlumberger). In addition, the UV may be programmed to perform automated tasks (e.g., to specific waypoints), and may also be paired with an application program (e.g., through the use of plug-ins) to perform more intricate tasks. Therefore, data captured and conveyed to the application program may be, for example only, analyzed, combined with other related historical data from a project, stored (e.g., electronically stored), shared with other systems, used to develop models, used in decision making (e.g., determining future tasks to be performed by the UV), or any combination thereof.

It will be appreciated that the foregoing summary is merely intended to introduce a subset of the subject matter discussed below and is, therefore, not limiting. Further, other aspects, as well as features and advantages of various aspects, of the present invention will become apparent to those of skill in the art through consideration of the ensuing description, the accompanying drawings and the appended claims.

DETAILED DESCRIPTION

Referring in general to the accompanying drawings, various embodiments of the present invention are illustrated to show the structure and methods for unmanned vehicle (UV) systems. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the disclosure.

The following provides a more detailed description of the present disclosure and various representative embodiments thereof. In this description, functions may be shown in block diagram form in order not to obscure the present invention in unnecessary detail. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art. While several embodiments and features of the present invention are described herein, modifications, adaptations, and other implementations are possible, without departing from the spirit and scope of the present invention.

According to various embodiments disclosed herein, UVs can be programmed to perform automated tasks (e.g., to specific waypoints), and can communicate with, or may be integrated into, application programs to perform tasks. Data captured and sent to an application program can be analyzed faster, and may be combined with other related historical data from a project, facilitating consideration of a larger amount of data upon which decisions may be made. Further, using UVs for these tasks may reduce risks to humans who may otherwise be called upon to perform such tasks.

In one example, one or more UVs may connect to an application program, such as Petrel®, using a framework, such as Ocean® framework directly. In another example, the one or more UVs may connect to an application program using a web service, such as Ocean® Web service (also owned by Schlumberger). The UVs may then link into the framework. Plug-ins, which may be custom built, may be configured to analyze and process the data captured by the UVs. The data, which may comprise, as non-limiting example, images, a video stream, GPS locations, and air quality data, may be shared with other environments, such as Studio®, on other platforms, such as AVOCET® or TECHLOG®, based on their respective domains.

Figure 1:
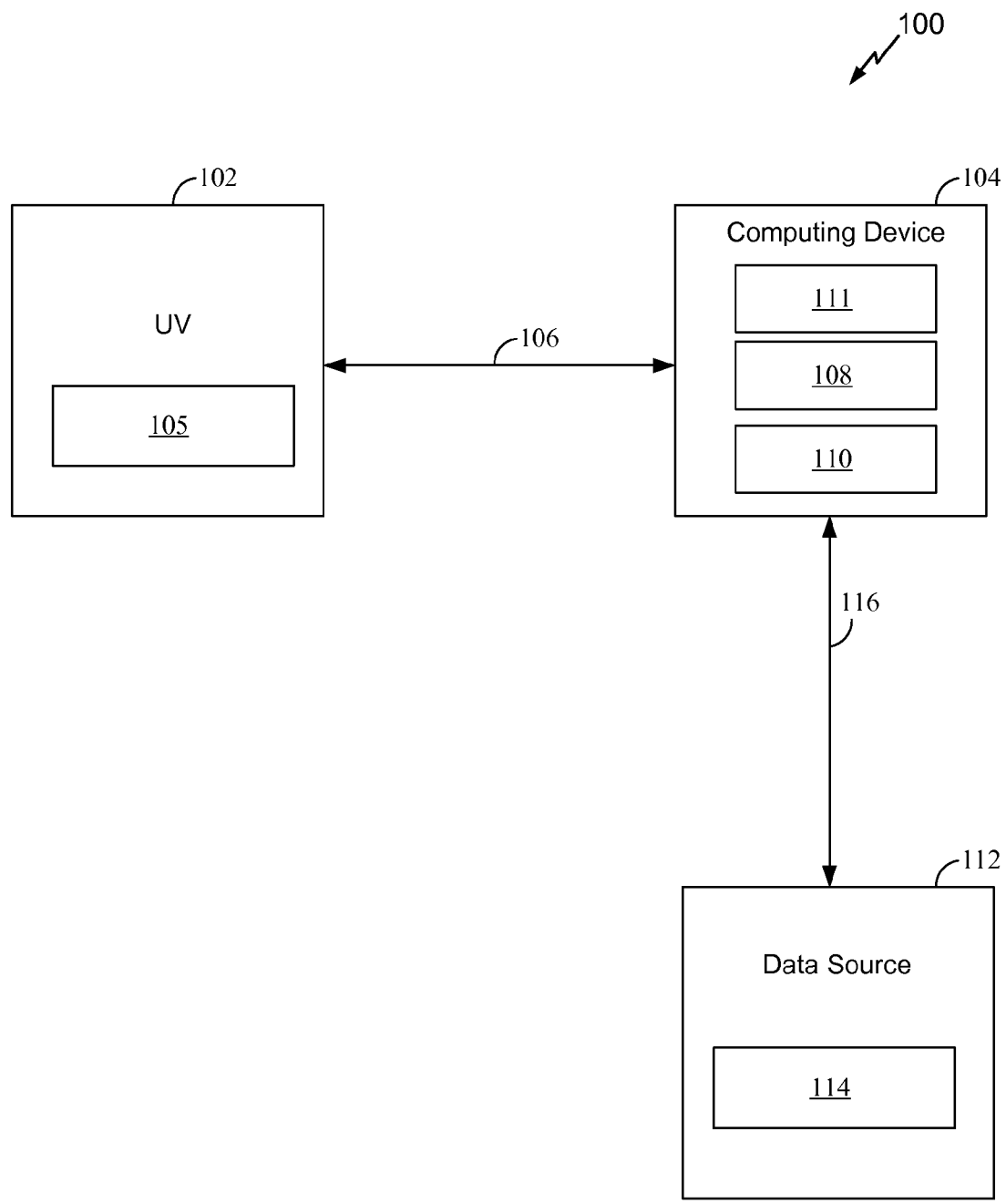
FIG. 1 depicts a system including an unmanned vehicle and a computing device, according to an embodiment of the present disclosure.

FIG. 1 illustrates an embodiment of a system 100 including an unmanned vehicle (UV) 102 and a computing device 104. UV 102 may include any known UV, such as an unmanned aerial vehicle (UAV) (e.g., a drone), an unmanned aerial system (UAS), an unmanned surface vehicle (USV), an unmanned ground vehicle (UGV), unmanned underwater vehicle (UUV), and the like. As will be appreciated, UV 102 may be configured to travel via land, sea, sub-sea, air, or any combination thereof. As will be appreciated, UV 102 may be used for performing a wide range of tasks. Examples of common UV usage include leak detection, pipeline monitoring, air quality analysis, foreign containment detection (e.g., in an oil field), smell detection, flare observation, and environmental monitoring.

UV 102 may include one or more sensing devices 105 for capturing data. Sensing devices 105 may be coupled to UV 102 or may be internal to UV 102. As non-limiting examples, sensing devices 105 may include cameras, location sensors (e.g., GPS sensors), electromagnetic spectrum sensors, gamma ray sensors, biological sensors, chemical sensors, thermal sensors, geophones, etc. UV 102, and more specifically, sensing devices 105, may be configured to capture, for example, time-dependent (e.g., variant) data, environmental data, or both. Time-dependent data may be associated with one or more geographical locations, which may include one or more areas of interest. The time-dependent data may also be associated with, for example, a production operation, a pipeline, flaring, and the like. Environmental data may include, for example only, seismic data, drilling data, surface images, or other types of data where the location varies but time may remain generally constant.

Computing device 104, which may be remote from UV 102, may include any suitable computing device. Computing device 104 may include an application program 108, memory 110, and a graphical user interface (GUI) 111, which may include one or more input/output (I/O) device, such as a display device. According to one embodiment, UV 102 may communicatively couple to computing device 104 via any suitable wired communication link, wireless communication link, or both. More specifically, UV 102 may communicate with remote computing device 104, and vice versa, via a communication link 106, which may comprise a wired communication link, a wireless communication link, or a combination thereof. In addition, as an example, UV 102 may communicatively couple to computing device 104 via a web service, a connection plug-in, or any suitable communication protocol (e.g., a wireless communication link via Wi-Fi, RF communication, etc.).

In one specific example, upon capturing data, UV 102 may attempt to connect to computing device 104 via a web service. If it is determined (e.g., by UV 102 or another device) that the connection via the web service is successful, a connection plug-in may be used to connect to application program 108 (e.g., a petroleum analytic software program), which may be configured to execute on computing device 104. If the connection via the web service is unsuccessful, UV 102 may be configured to establish communication to application program 108 via any suitable standard communication protocol (e.g., Wi-Fi, RF communication, and the like). Upon receipt, application program 108 may analyze and process data received from UV 102. In addition, computing device 104 may be configured to store processed data (e.g., within memory 110) and share data with other devices, systems, and/or programs (e.g., computers and/or databases), which may be remote from computing device 104. For example only, computing device 104 may be configured to convey data, via a wired and/or a wireless communication link, to another computing device.

Further, according to one embodiment, computing device 104 may be configured to receive and analyze data from a source 112 (e.g., one or more other computers and/or programs). It is noted that source 112, which may include memory 114, may comprise any suitable data source, such as another computing device (e.g., a remote computing device). As illustrated, computing device 104 may be coupled to source 112 via a communication link 116, which may comprise a wired communication link, a wireless communication link, or a combination thereof. Data received from source 112 may be combined and analyzed with the data received from UV 102. In one specific example, computing device 104 may retrieve data (e.g. historical data relating to the area of interest) from a source (e.g., a petroleum software package within source 112), and may use and/or combine the data with the data from UV 102. Combined data may be further analyzed and stored (e.g., electronically stored), shared with other systems, used to develop models, used in decision making (e.g., determining future tasks to be performed by the UV), or any combination thereof According to other embodiments, computing device 104 may be configured to control operation of UV 102 (e.g., provide waypoints, objectives, trajectories, etc.) via one or more control signals conveyed thereto. More specifically, according to one embodiment, application program 108 may enable computing device 104 and/or a user of computing device 104 to determine if and what additional information may be needed or desired from UV 102 (e.g., for accurate decision-making, model generation, etc.). Further, UV 102 may be tasked or otherwise controlled via computing device 104 to perform one or more tasks (e.g., to collect such information). Thereafter, computing device 104, and/or a user via computing device 104, may perform tasks, adjust the system or environment models, make decisions, etc. using the information collected by UV 102. It is noted that although application program 108 is illustrated as being within computing device 104, application program 108 may exist on UV 102, computing device 104, another device, or any combination thereof.

Figure 2:
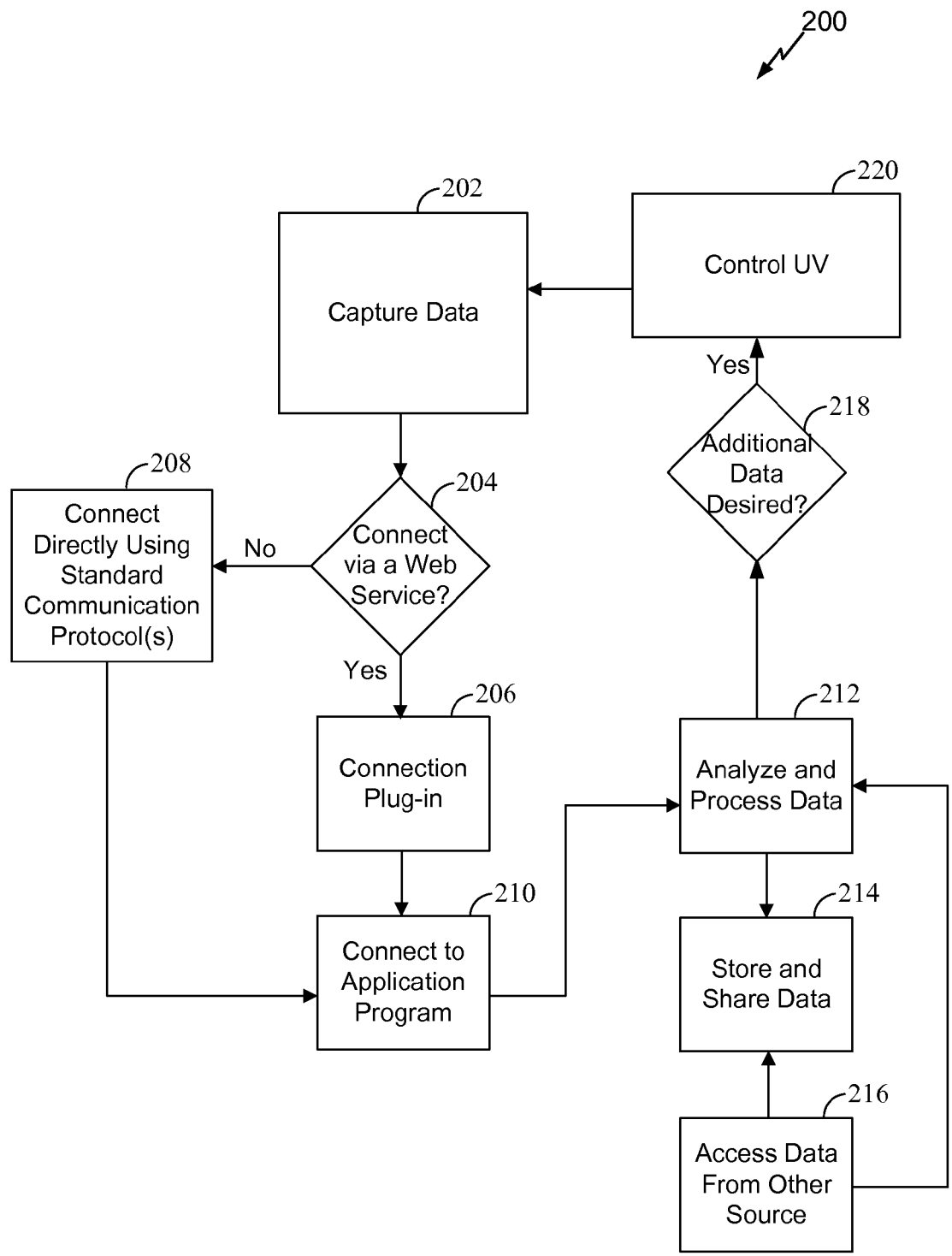
FIG. 2 is a flowchart depicting a method, according to an embodiment of the present disclosure.

FIG. 2 illustrates a contemplated method 200, in accordance with an embodiment of the present disclosure. With reference to FIGS. 1 and 2, method 200 will now be described. Initially, UV 102, which may be positioned near (e.g., proximate to) an area of interest (e.g., near an oilfield), may capture data (depicted by act 202). As will be appreciated, the captured data, which may also be referred to herein as "sensed data," may comprise any data that may be captured by a UV. As non-limiting examples, the captured data may comprise photographs, location data (e.g., GPS data), electromagnetic spectrum data, gamma ray data, biological data, chemical data, temperature data, mechanical data, and electrical data.

Further, method 200 may include attempting to connect to computing device 104 via a web service (depicted by act 204). If the attempted connection is successful, method 200 may include utilizing a connection plug-in to connect to computing device 104 (depicted by act 206). If the attempted connection (i.e., via the web service) is not successful, method 200 may comprise coupling to computing device 104 via any suitable communication protocol (e.g., Wi-Fi, RF communication, etc.) (depicted by act 208). Moreover, upon coupling to computing device 104, UV 102 may couple to application program 108 (depicted by act 210), which may at least partially reside on computing device 104.

Continuing at act 212, application program 108 may be configured to receive and process the captured data. Moreover, method 200 may include storing the captured data, sharing the captured data, or both (depicted by act 214). In addition, method 200 may include accessing additional data from another source (e.g., another software application or system) (depicted by act 216). Stated another way, application program 108 may receive and process the captured data (i.e., from UV 102) along with the additional data (e.g., from data source 112). Further, method 200 may include determining if and what additional information may be needed or desired from UV 102 for accurate decision-making (depicted by act 218). If it is determined that additional information (i.e., additional data) is required, computing device 104 may convey one or more signals to UV 102 to cause UV 102 to perform one or more tasks to collect the required information (depicted by act 220).

Figure 3:
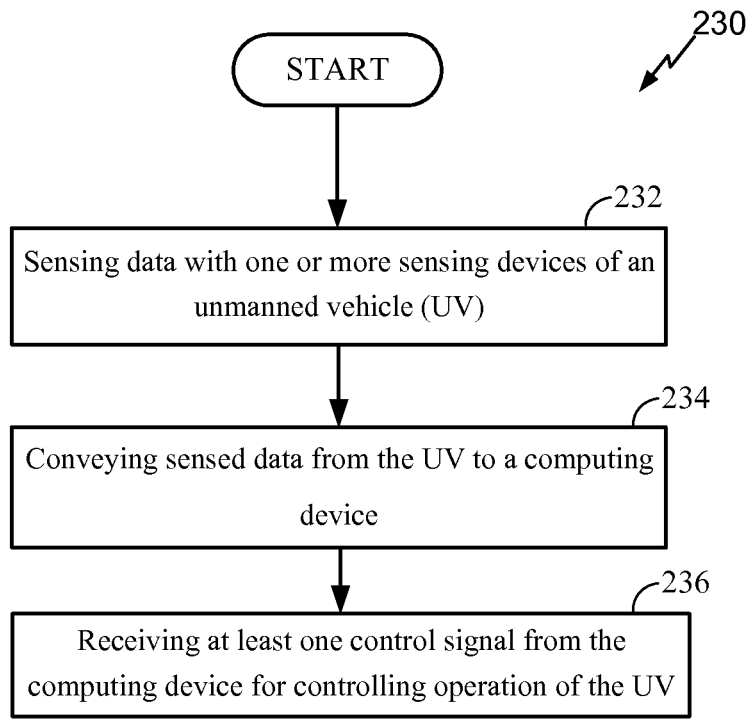
FIG. 3 is a flowchart depicting another method, in accordance with an embodiment of the present disclosure.

FIG. 3 is a flowchart of a method 230, according to an embodiment of the present disclosure. Method 230 may include sensing data with one or more sensing devices of a UV (depicted by act 232). Method 230 may further include conveying sensed data from the UV to a computing device (depicted by act 234). In addition, method 230 may include receiving at least one control signal from the computing device for controlling operation of the UV (depicted by act 236).

Figure 4:
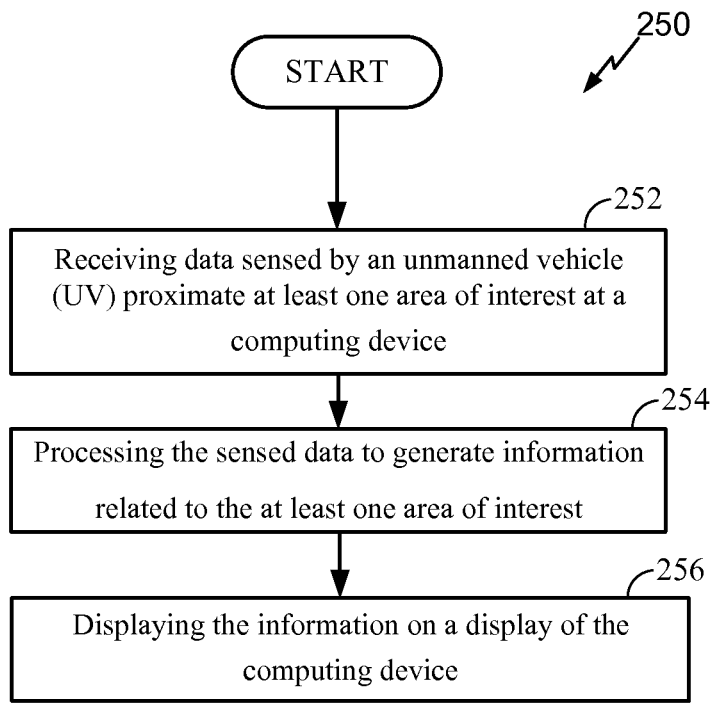
FIG. 4 is a flowchart depicting another method, according to an embodiment of the present disclosure.

FIG. 4 is a flowchart of a method 250, according to another embodiment of the present invention. Method 250 includes receiving data sensed by a UV proximate at least one area of interest at a computing device (depicted by act 252). Method 250 further includes processing the sensed data to generate information related to the at least one area of interest (depicted by act 254). In addition, method 250 may include conveying the information via at least one output device (depicted by act 256). As non-limiting examples, the output device may comprise any I/O device, such as a display device or an output port configured for conveying data to another device.

Figure 5:
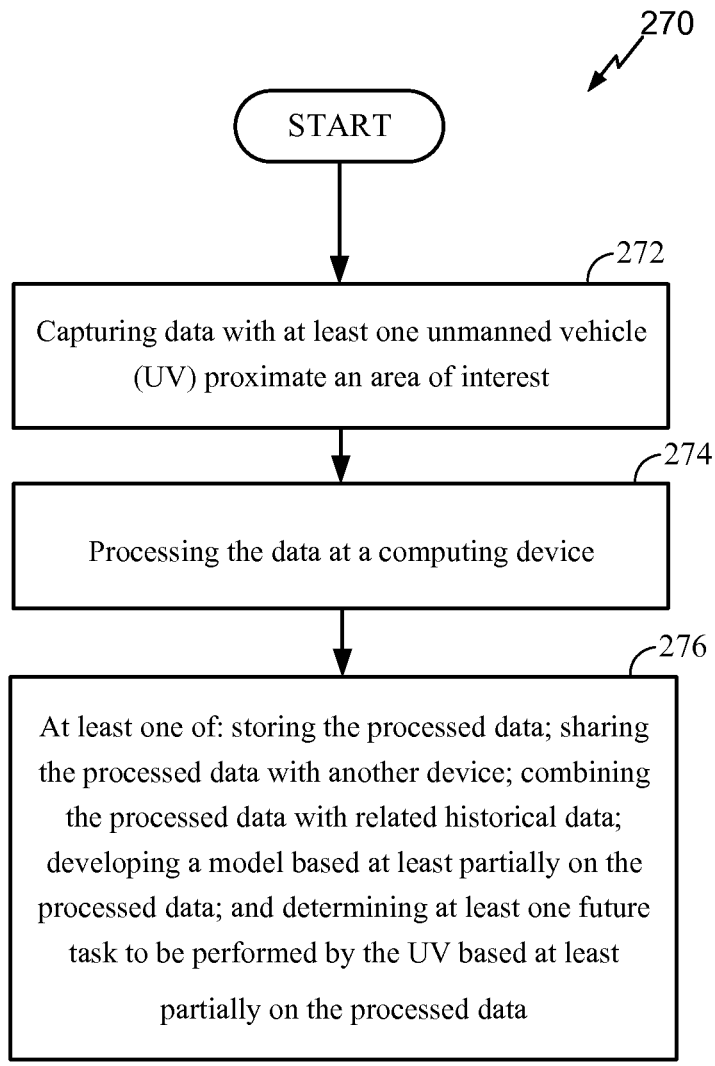
FIG. 5 is a flowchart depicting yet another method, according to an embodiment of the present disclosure.

FIG. 5 is a flowchart of yet another method 270, according to another embodiment of the present invention. Method 270 includes capturing data with at least one UV proximate an area of interest (depicted by act 272). Method 250 further includes processing the data at a computing device (depicted by act 274). In addition, method 270 may include at least one of: storing the processed data; sharing the processed data with another device; combining the processed data with related historical data; developing a model based at least partially on the processed data; and determining at least one future task to be performed by the UV based at least partially on the processed data (depicted by act 276).

Figure 6:
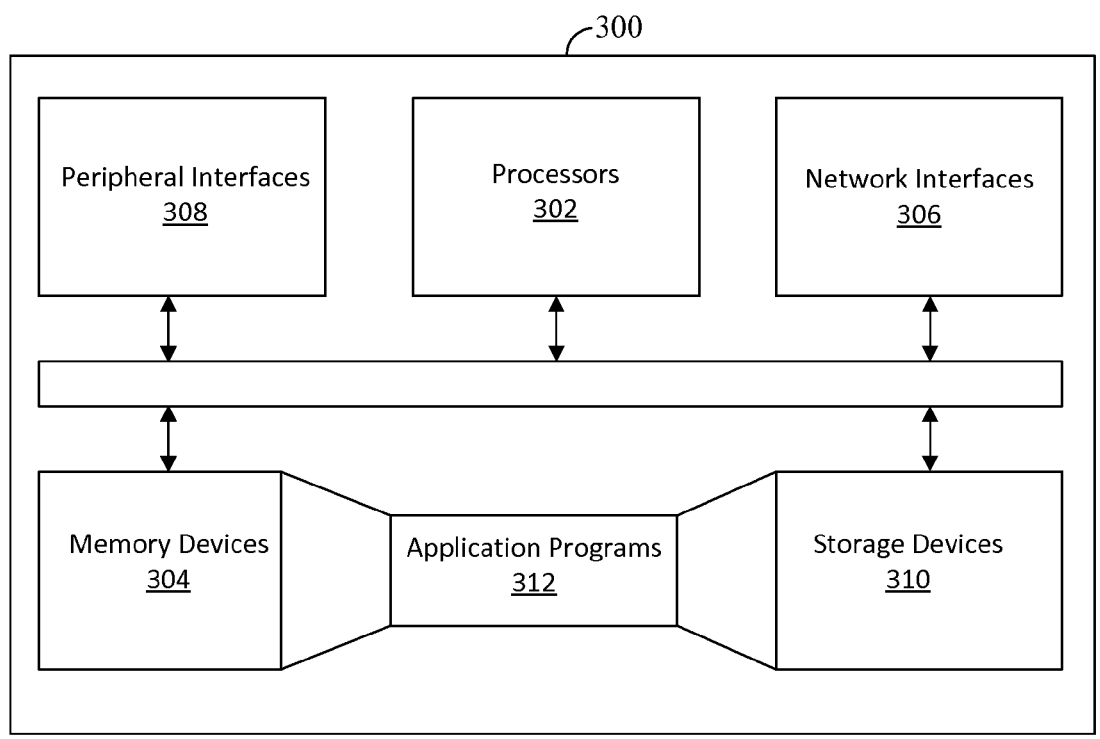
FIG. 6 illustrates a system, in accordance with an embodiment of the present disclosure.

Embodiments of the disclosure may also include one or more systems for implementing one or more embodiments disclosed herein. FIG. 6 illustrates a schematic view of a processing system 300, according to an embodiment of the present disclosure. In an example, processing system 300 may be integrated with UV 102 (see FIG. 1), computing device 104 (see FIG. 1), another device, or any combination thereof. Processing system 300 may include one or more processors 302 of varying core configurations (including multiple cores) and clock frequencies. Processors 302 may be operable to execute instructions, apply logic, etc. It will be appreciated that these functions may be provided by multiple processors or multiple cores on a single chip operating in parallel and/or communicably linked together. In at least one embodiment, processors 302 may comprise and/or include one or more GPUs.

Processing system 300 may also include a memory system, which may be or include one or more memory devices and/or computer-readable media 304 of varying physical dimensions, accessibility, storage capacities, etc. such as flash drives, hard drives, disks, random access memory, etc., for storing data, such as images, files, and program instructions for execution by processors 302. In an embodiment, computer-readable media 304 may store instructions that, when executed by processors 302, are configured to cause processing system 300 to perform operations. For example, execution of such instructions may cause processing system 300 to implement one or more embodiments described herein.

Processing system 300 may also include one or more network interfaces 306, which may include any hardware, applications, and/or other software. Accordingly, network interfaces 306 may include Ethernet adapters, wireless transceivers, PCI interfaces, and/or serial network components, for communicating over wired or wireless media using protocols, such as Ethernet, wireless Ethernet, etc.

Processing system 300 may further include one or more peripheral interfaces 308, for communication with a display screen, projector, keyboards, mice, touchpads, sensors, other types of input and/or output peripherals, and/or the like. In some implementations, the components of processing system 300 need not be enclosed within a single enclosure or even located in close proximity to one another, but in other implementations, the components and/or others may be provided in a single enclosure.

Memory device 304 may be physically or logically arranged or configured to store data on one or more storage devices 310. Storage device 310 may include one or more file systems or databases in any suitable format. Storage device 310 may also include one or more application programs 312, which may contain interpretable or executable instructions for performing one or more of the disclosed processes. It is noted that application programs 312 may comprise application program 108 (see FIG. 1). When requested by processors 302, one or more of the application programs 312, or a portion thereof, may be loaded from storage devices 310 to memory devices 304 for execution by processors 302.

Those skilled in the art will appreciate that the above-described componentry is merely one example of a hardware configuration, as the processing system 300 may include any type of hardware components, including any necessary accompanying firmware or software, for performing the disclosed implementations. Processing system 300 may also be implemented in part or in whole by electronic circuit components or processors, such as application-specific integrated circuits (ASICs) or field-programmable gate arrays (FPGAs).

Although the foregoing description contains many specifics, these should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

What is claimed:

1. A method, comprising:
sensing data with one or more sensing devices of an unmanned vehicle (UV) for exploring and monitoring an oilfield, observing gas flares, studying the environmental impact of oil and gas systems, or a combination thereof;
conveying sensed data from the UV to a computing device;
receiving at least one control signal from the computing device for controlling operation of the UV, the at least one control signal comprising a waypoint and an automated task associated with the waypoint; and
performing the automated task based on sensing location data associated with the waypoint.

2. The method of claim 1, wherein sensing data comprises sensing data with at least one of a camera, a location sensor, an electromagnetic spectrum sensor, a gamma ray sensor, a biological sensor, a chemical sensor, a thermal sensor, and a geophone.

3. The method of claim 1, further comprising communicatively coupling to the computing device via at least one of a web service, a plug-in, and a wireless communication link.

4. The method of claim 1, wherein sensing data comprises sensing time-dependent data, environmental data, or a combination thereof, wherein:
the time-dependent data is associated with a production operation, a pipeline, flaring, or a combination thereof, and
the environmental data comprises seismic data, drilling data, surface images, or a combination thereof.

5. A method, comprising:
receiving data sensed by an unmanned vehicle (UV) proximate at least one area of interest associated with an oilfield at a computing device;
processing the sensed data to generate information related to the at least one area of interest, the information comprising at least one control signal comprising a waypoint and an automated task associated with the waypoint; and
conveying the information via at least one output device, whereby the UV performs the automated task based on sensing location data associated with the waypoint.

6. The method of claim 5, wherein processing the sensed data comprises processing the sensed data with an application specific program.

7. The method of claim 5, wherein the sensed data comprises time-dependent data, environmental data, or a combination thereof, wherein:
the time-dependent data is associated with a production operation, a pipeline, flaring, or a combination thereof, and
the environmental data comprises seismic data, drilling data, surface images, or a combination thereof.

8. The method of claim 5, further comprising retrieving historical data related to the area of interest and processing the historical data and the sensed data to generate additional information of the area of interest.

9. The method of claim 8, further comprising at least one of storing and sharing at least one of the information and the additional information.

10. A system, comprising:
an unmanned vehicle (UV) for exploring and monitoring an oilfield, observing gas flares, studying the environmental impact of oil and gas systems, or a combination thereof, the UV including one or more sensing devices; and
a computing device communicatively coupled to the UV and configured to:
receive and process data sensed by the one or more sensing devices; and
convey information to the UV comprising at least one control signal comprising a waypoint and an automated task associated with the waypoint, whereby the UV performs the automated task based on sensing location data associated with the waypoint.

11. The system of claim 10, the computing device including memory for storing the data.

12. The system of claim 10, the computing device including a display configured to display the processed sensed data.

13. The system of claim 10, the computing device configured to combine data received from the UV with related historical data.

14. The system of claim 10, the one or more sensing devices comprising one or more of a camera, a location sensor, an electromagnetic spectrum sensor, a gamma ray sensor, a biological sensor, a chemical sensor, a thermal sensor, and a geophone.

15. A non-transitory computer-readable storage medium storing instructions that when executed by a processor cause the processor to perform instructions, the instructions comprising:
   receiving data sensed by an unmanned vehicle (UV) positioned proximate an area of interest associated with an oilfield at a computing device;
   processing the received data to generate information related to the area of interest, the information comprising at least one control signal comprising a waypoint and an automated task associated with the waypoint;
   displaying the information on a display of the computing device; and
   conveying the information to the UV, whereby the UV performs the automated task based on sensing location data associated with the waypoint.

16. The non-transitory computer readable media of claim 15, the instructions further comprising retrieving other data related to the area of interest.

17. The non-transitory computer readable media of claim 16, the instructions further comprising processing the information with the retrieved other data to generate additional data related to the area of interest.

18. The non-transitory computer readable media of claim 17, the instructions further comprising at least one of storing at least one of the information and the additional data and sharing the at least one of the information and the additional data with at least one other computing device.

19. The non-transitory computer readable media of claim 15, the instructions further comprising:
   determining, at least partially based on the information, if additional data is needed from the UV;
   if additional data is needed, determining what type of additional data is needed; and
   conveying one or more signals to the UV to request the additional data.

20. A method, comprising:
   capturing data with at least one unmanned vehicle (UV) proximate an area of interest associated with an oilfield;
   processing the data at a computing device;
   determining at least one future task to be performed by the UV based at least partially on the processed data, wherein the at least one future task comprises a waypoint and an automated task associated with the waypoint;
   conveying the at least one future task to the UV, whereby the UV performs the automated task based on sensing location data associated with the waypoint; and:
   storing the processed data;
   sharing the processed data with another device;
   combining the processed data with related historical data;
   developing a model based at least partially on the processed data;
   or a combination thereof.

* * * * *